April 28, 1936.   R. F. PEO   2,038,598
HYDRAULIC SHOCK ABSORBER
Filed Aug. 25, 1934   2 Sheets-Sheet 1
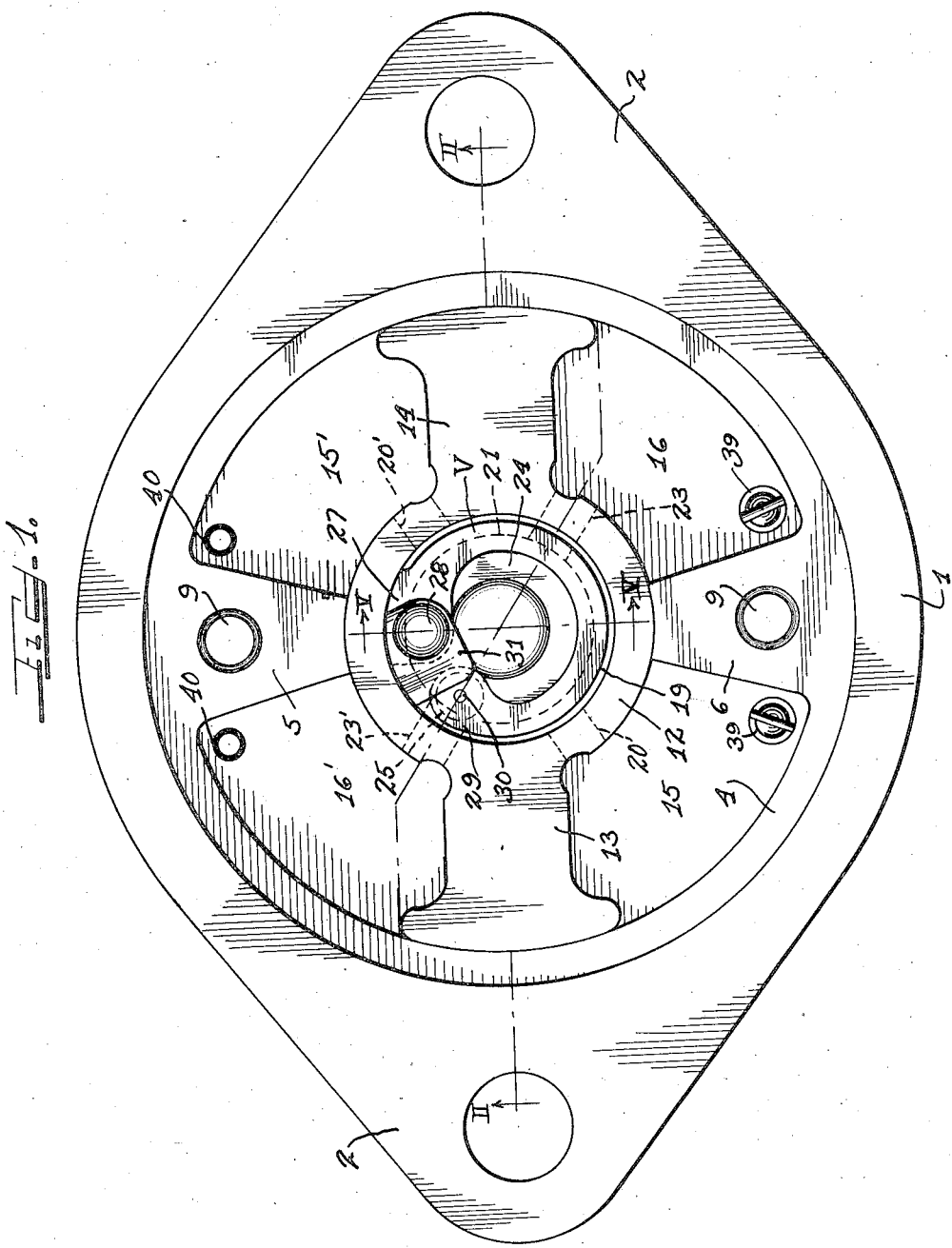
Inventor
Ralph F. Peo.
by Charles Hill Attys.

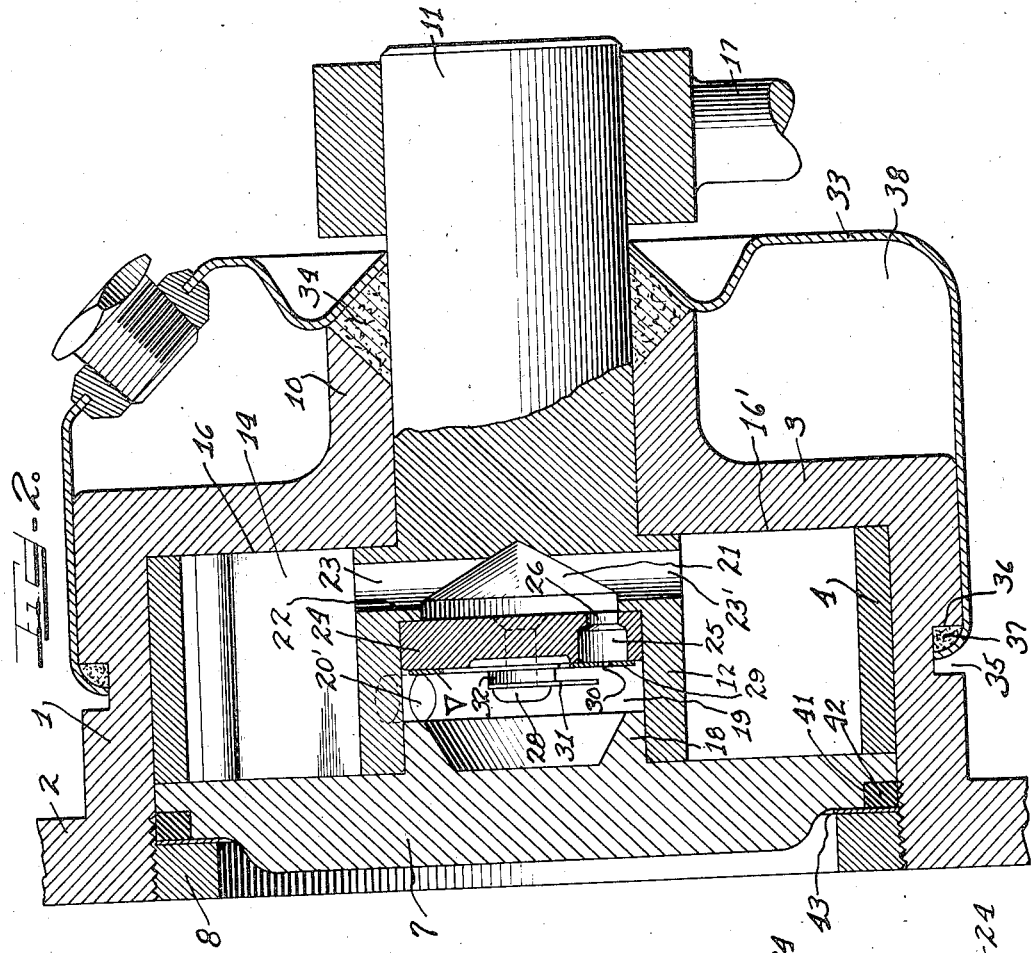
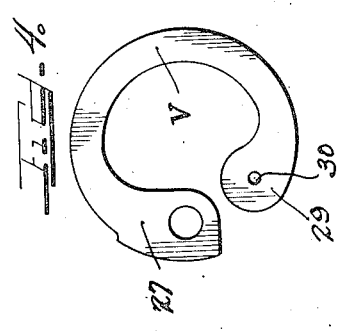
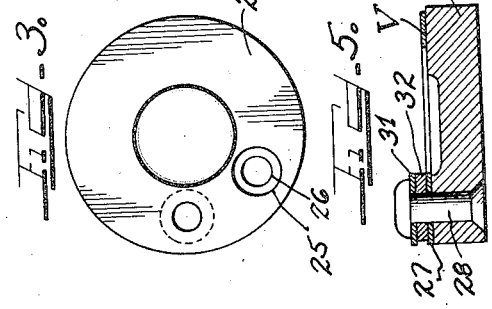

Patented Apr. 28, 1936

2,038,598

UNITED STATES PATENT OFFICE 2,038,598

HYDRAULIC SHOCK ABSORBER

Ralph F. Peo, Buffalo, N. Y., assignor to Houde Engineering Corporation, Buffalo, N. Y., a corporation of New York Application August 25, 1934, Serial No. 741,401

9 Claims. (Cl. 188—89)

This invention relates to hydraulic shock absorbers and concerns particularly improved and simplified structure and arrangement for metering the fluid flow between the high and low pressure chambers as the fluid is displaced by an oscillating piston structure.

An important object of the invention is to provide a unitary valving and metering assembly comprising a seat member and a reed valve member mounted on the seat member and having a restricted metering orifice registering with a larger metering orifice in the seat member, the arrangement being such that the flow from the high pressure to the low pressure side of an oscillating piston structure will hold the valve against its seat so that the flow will be confined to the restricted valve orifice, and the valve will be deflected from its seat by the flow in reverse direction so that the larger orifice may meter such flow.

Another important object is to provide means for preventing undue flexure of the reed valve by the fluid impinging thereagainst during flow from the low pressure to the high pressure side of the piston structure.

Another important object is to provide within a limited space a comparatively long reed valve so that the flexure resistance of the valve will not interfere with the fluid flow and the valve will not be subjected to undue flexure and strain.

My invention also involves other features of structure arrangement and operation, all the various features being shown incorporated in the structure disclosed on the drawings, in which drawings:

Figure 1 is an end view of a shock absorber structure with the cover structure removed to more clearly show the valving arrangement;

Figure 2 is a section on plane II—II Figure 1;

Figure 3 is a plan view of the seat member;

Figure 4 is a plan view of the valve member; and

Figure 5 is a section on plane V—V Figure 1.

The shock absorber to which I have shown my invention applied comprises a housing 1 in a form of a cup and having ears 2 extending laterally from its end so that it may be secured to a support such as the chassis of an automotive vehicle. Fitting into the housing and abutting against the wall 3 thereof is a ring 4 from which partition lugs 5 and 6 extend radially inwardly. A cover or closure structure 7 fits into the end of the housing to abut the adjacent ends of the ring and lugs, and a clamping ring 8 is screwed into the housing against the cover to securely hold the cover in place. Dowel pins 9 extend through the partition lugs and into the wall 3 and secure the partition structure against rotational displacement in the housing.

The wall 3 of the housing has a bearing extension 10 for the shaft 11 extending from the piston hub 12, which hub has vanes 13 and 14 extending therefrom, the vanes and the partition lugs dividing the space within the ring 4 into high pressure working chambers 15 and 15' and low pressure working chambers 16 and 16' in which the fluid is displaced when the shaft and piston structure are oscillated, the shaft having a lever 17 extending therefrom for connection usually with the axle of the automotive vehicle.

The cover structure 7 has a lug 18 which receives the recess 19 at the inner end of the piston hub 12, the lug forming a centering and bearing support for the shaft and piston structure. The recess 19 forms a fluid chamber which is connected by ports 20 and 20' with the high pressure working chambers 5 and 15' respectively.

Outwardly of the recess or chamber 19, the piston hub is bored to provide the fluid chamber 21 and to leave the annular shoulder 22 which provides a seat for my improved metering and valving assembly. The chamber 21 is connected by ports 23 and 23' with the low pressure working chambers 16 and 16' respectively.

The valve assembly comprises the seat disc 24 which at one side of its axis has the bore 25 therethrough which bore is of reduced diameter at its outer end to provide a sharp edge orifice 26 connecting the bore with the chamber 21. The valve member V shown is a flat piece of suitable thin spring metal in the form of an open annulus. This valve member engages the inner side of the seat disc 24, the end 27 of the annulus being anchored to the disc as by means of a rivet 28. The other end 29 of the valve annulus is of circular shape to extend across and form a closure on the inner end of the bore 25 in the seat 24, this valve end having the sharp edge orifice 30 therethrough which is more restricted than the orifice 26.

During operation of the shock absorber, the hydraulic fluid displaced during compression movement of the vehicle spring will flow from the low pressure working chambers 16 and 16' through the ports 23 and 23' into the fluid chamber 21 and from there through the metering orifice 26 into the bore 25 and against the valve, the fluid pressure deflecting the valve member away from the bore end so that the fluid may readily flow into the chamber 19 and from there through ports 20 and 20' into the high pressure working chambers 15 and 15'. During rebound movement of the vehicle spring the fluid flows in reverse direction, the pressure of the fluid against the valve member holding it against the seat disc 24 with its end 29 across the bore 25 so that all the fluid flow must be through the flow restricting orifice 30. This orifice 30 thus controls the shock absorber resistance during rebound movement of the vehicle springs while the larger orifice 26 determines the shock absorber resistance during compression movement of the vehicle springs.

In order to protect the valve member against undue flexure by the fluid flow during spring compression, I provide a stop for limiting the valve flexure. As shown, a stop plate 31 is secured between the head of the anchoring rivet 38 and a spacing washer 32 of the rivet, the plate extending in front of the orifice end 29 of the valve to limit the flexure movement away from the seating disc 24.

As shown the outer edge of the end 27 of the valve member is arcuate to engage against the wall surrounding the chamber 19, such engagement serving to hold the valve annulus in proper alignment. The outer edge of the stop plate may also be curved to fit against the wall of the chamber 19 so that this stop plate will be accurately held in proper alignment. By making the valve V in the form of an open annulus its length will be such that the flexure will be more distributed and not localized, and breakage, which might result from repeated flexure, will be avoided. The flexure resistance of the valve will also be reduced so that it may be readily unseated by the fluid stream during the vehicle spring compression movement.

The disc 24 with the valve structure mounted thereon forms a unitary structure which can be readily and accurately assembled before application to a shock absorber. The diameter of the disc 24 is preferably such that the disc may be press-fitted into the chamber 19 to be rigidly held in position by friction.

It will be noted that the bore 25 forms an expansion chamber between the orifices 30 and 26 so that these orifices may properly function as sharp edge orifices to compensate for variation in the temperature and viscosity of the hydraulic fluid.

On the shock absorber body structure shown, a cup shaped shell 33 intimately receives the annular wall of the housing 1 and its bottom is apertured to receive the shaft 11. Packing material 34 is held between the end of the bearing extension 10 and the shell to prevent leakage of fluid along the shaft to the exterior of the shock absorber structure. The housing 1 has the annular channel 35 providing a shoulder 36 around which the rim of the shell is deflected, suitable packing material 37 being interposed so as to prevent leakage of fluid from the reservoir 38 formed by the shell 33 and the housing.

The lower working chambers within the shock absorber body receive replenishing fluid from the reservoir through check valve controlled passages 39, and vent passages 40 connect the upper working chambers with the reservoir for escape of collected air or gases.

The cover structure 7 has the peripheral recess 41 for receiving packing 42, a metal washer 43 being interposed between the clamping ring 8 and the cover 7 and the packing to prevent escape of fluid from the working chambers. The clamping ring and the cover are entirely within the end of the housing 1 so as not to interfere with the proper seating and securing of the shock absorber to its support member.

I have shown a practical and efficient embodiment of the various features of my invention but I do not desire to be limited to the exact construction, arrangement, and operation shown and described, and changes and modifications may readily be made without departing from the scope of the invention.

I claim as my invention:

1. In a hydraulic shock absorber having hydraulic working chambers, a piston operable to displace the fluid in said chambers, a passage for the flow of the displaced fluid, a unitary valve structure interposed in said passageway and comprising a seat element having a port therethrough, a reed valve permanently secured at its outer end to said seat element with its free end overlying one end of said port and having a restricted orifice registering with said port, the other end of said port terminating in a metering orifice.

2. In a hydraulic shock absorber, a housing structure providing high and low pressure working chambers, a piston structure operable to displace the fluid in said chambers, a passageway for the interflow of fluid between said chambers, said passageway including a valve chamber, and a unitary valving assembly for controlling the fluid flow, said valving assembly comprising a disc in said valve chamber having a bore therethrough, a reed valve permanently secured at one end to said disc with its other end overlying the adjacent end of said bore and having a metering orifice in alignment with said bore, said valve orifice metering the flow from the high pressure to the low pressure chambers, the other end of said bore being contracted to form a metering orifice for metering the flow from the low pressure to the high pressure chambers.

3. In a hydraulic shock absorber, the combination of a casing, a piston operable in said casing, a passageway for the flow of fluid displaced by the piston, and a valving assembly comprising a disc interposed in said passageway and having an opening therethrough, a valve in the form of an open annulus secured at one end to said disc with its other end cooperating with said opening and having an orifice therethrough, said valve opening to permit flow in one direction through said opening and closing against flow in the opposite direction to confine the flow through said orifice.

4. In a hydraulic shock absorber, the combination of a casing, a piston operable in said casing, a passageway for the flow of fluid displaced by the piston, and a valving assembly comprising a disc interposed in said passageway and having an opening therethrough, a valve in the form of an elongated plate anchored at one end to said disc and extending along the periphery of said disc with its free end terminating adjacent to its anchored end to cooperate with said opening and having an orifice therethrough, said valve flexing to permit flow in one direction through said opening and closing against flow in the opposite direction to confine the flow through said orifice, and a stop for limiting the flexure of said valve.

5. In a hydraulic shock absorber, the combination of a housing, a piston operable in said housing and having a passageway therethrough for the displaced fluid, said passageway including a cylindrical valve chamber, and a unitary valve assembly, said valve assembly comprising a disc seated in said valve chamber and having an opening interposed in said passageway, a flap valve secured at one end to said disc with its other end covering said opening and provided with an orifice in register with said opening, said valve flexing to permit flow in one direction through said opening and closing in the opposite direction to confine the flow through said orifice, and a stop on said disc for limiting the flexure of said valve.

6. In a hydraulic shock absorber, the combination of a housing, a piston operable in said housing and having an opening therethrough, a flap valve in the form of an open annulus secured at one end in said piston with its other end covering said opening and having an orifice, said valve opening to permit flow in one direction through said opening and closing in the opposite direction to confine the flow through said orifice.

7. In a hydraulic shock absorber, the combination of a housing, a piston operable in said housing and having an opening therethrough, a flap valve in the form of an open annulus secured at one end in said piston with its other end covering said opening and having an orifice, said valve opening to permit flow in one direction through said opening and closing in the opposite direction to confine the flow through said orifice, and a stop for limiting the flexure of said valve.

8. In a hydraulic shock absorber, the combination of a housing, a piston operable in said housing to displace the fluid therein, a passageway for the flow of the displaced fluid including a valve chamber, and a unitary valving assembly in said chamber, said valving assembly comprising a disc having an opening therethrough, a flat reed valve in the form of an open annulus secured at one end to said disc with its other end covering said opening and having an orifice in register with said opening, said valve opening to permit flow in one direction through the opening but closing said opening against flow in the opposite direction to confine the flow through said orifice, and a stop on said disc for limiting the flexure of said valve.

9. In a hydraulic shock absorber, the combination of a casing, a piston operable in said casing, a passageway for the flow of fluid displaced by the piston, a valving assembly comprising a disc interposed in said passageway and having an opening therethrough, a valve in the form of an elongated plate anchored at one end to said disc and extending around along the periphery of said disc with its free end terminating adjacent to its anchored end to cooperate with said opening and having an orifice therethrough, said valve flexing to permit flow in one direction through said opening and closing against flow in the opposite direction to confine the flow through said orifice, and a stop at the anchored end of said valve for limiting the flexure movement of the free end thereof.

RALPH F. PEO.